(12) United States Patent
Srinivas et al.

(10) Patent No.: US 8,599,880 B1
(45) Date of Patent: Dec. 3, 2013

(54) UTILIZING THE MOBILE-STATION SIMULTANEOUS HYBRID DUAL RECEIVE (SHDR) CAPABILITY TO IMPROVE FEMTOCELL PERFORMANCE

(75) Inventors: Shilpa Kowdley Srinivas, Herndon, VA (US); Jason P. Sigg, Overland Park, KS (US); Ryan S. Talley, Overland Park, KS (US); Christopher M. Yenney, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1084 days.

(21) Appl. No.: 12/569,325

(22) Filed: Sep. 29, 2009

(51) Int. Cl.
*H04B 3/10* (2006.01)
*H04B 15/00* (2006.01)
*G01R 31/08* (2006.01)
*H04W 4/00* (2009.01)
*H04W 36/00* (2009.01)

(52) U.S. Cl.
USPC .......... 370/491; 370/216; 370/331; 455/63.3; 455/437

(58) Field of Classification Search
USPC ................. 370/331, 216, 311; 455/63.3, 437
See application file for complete search history.

(56) References Cited

U.S. PATENT DOCUMENTS

| | | | |
|---|---|---|---|
| 6,496,475 B1 * | 12/2002 | Ji et al. | 370/216 |
| 6,643,272 B1 * | 11/2003 | Moon et al. | 370/311 |
| 7,069,030 B2 | 6/2006 | Yoon | |
| 7,076,245 B1 | 7/2006 | Satapathy | |
| 2008/0117876 A1 * | 5/2008 | Hidaka et al. | 370/331 |
| 2009/0170440 A1 * | 7/2009 | Eyuboglu et al. | 455/63.3 |
| 2009/0196253 A1 * | 8/2009 | Semper | 370/331 |
| 2010/0130209 A1 * | 5/2010 | Florkey et al. | 455/437 |

\* cited by examiner

*Primary Examiner* — Ian N Moore
*Assistant Examiner* — Kiet Tang

(57) ABSTRACT

Methods and systems are provided for utilizing the mobile-station simultaneous hybrid dual receive (SHDR) capability to improve femtocell performance. A femtocell provides service to one or more SHDR mobile stations, each having (1) a transmit and primary receive chain (TxRx0) for communicating with and via the femtocell and (2) a secondary receive chain (Rx1) for monitoring a macro network, including monitoring a detected signal strength of one or more pilot channels of one or more macro-network coverage areas. The femtocell receives reports from at least the SHDR mobile stations to which the femtocell is providing service, the reports reflecting at least the detected signal strengths of the respective macro-network pilot channels. The femtocell uses the received reports for making and carrying out decisions as to whether or not to instruct one or more SHDR mobile stations to handoff to the macro network.

17 Claims, 4 Drawing Sheets

UTILIZING THE MOBILE-STATION SIMULTANEOUS HYBRID DUAL RECEIVE (SHDR) CAPABILITY TO IMPROVE FEMTOCELL PERFORMANCE

BACKGROUND

1. Macro Cellular Wireless Networks

Many people use mobile stations (e.g. cell phones and personal digital assistants (PDAs)) to communicate with macro cellular wireless networks (i.e. wireless wide area networks (WWANs)), which typically provide communication services such as voice, text messaging, and packet-data communication. These mobile stations (i.e. access terminals) and networks typically communicate with each other over a radio frequency (RF) air interface according to a wireless protocol (e.g. CDMA (Code Division Multiple Access), EV-DO (Evolution Data Optimized), and/or one or more others). Mobile stations typically conduct wireless communications with these networks via one or more base transceiver stations (BTSs), each of which send communications to and receive communications from mobile stations over the air interface.

Each BTS is in turn connected with a network entity known as a base station controller (BSC) (i.e. radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. As examples, an MSC may interface with the public switched telephone network (PSTN), while a PDSN may interface with one or more core packet data networks and/or the Internet. As such, mobile stations can typically communicate over the one or more signaling and/or transport networks from anywhere inside the coverage area of one or more BTSs, via the BTS(s), a BSC, and a switch or gateway such as an MSC and/or PDSN.

The base stations (i.e. BTSs or combinations of (1) one or more BTSs and (2) a BSC) for these macro cellular networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as macro (or macro-network) base stations, and the network they collectively form—or to which they collectively belong—is referred to generally and herein as the macro network. And the BTSs associated with macro networks may be referred to herein as macro BTSs (or just BTSs).

Mobile stations and macro base stations conduct communication sessions (e.g. voice calls and data sessions) over frequencies known as carriers (i.e. macro carriers), each of which may actually be a pair of frequencies, with the base station transmitting to the mobile station on one of the frequencies, and the mobile station transmitting to the base station on the other. This approach is known as frequency division duplex (FDD). And the base-station-to-mobile-station link is known as the forward link, while the mobile-station-to-base-station link is known as the reverse link. Note that an instance of a carrier in a macro coverage area referred to as a sector may be known and referred to herein as a sector-carrier or macro sector-carrier.

2. Femtocells

Many macro-network subscribers, including private consumers and small businesses, among others, in addition to having wireless service (which may include data service) for their respective mobile stations, also have high-speed (a.k.a. broadband) Internet access through another communication channel, which may be cable-modem service, digital-subscriber-line (DSL) service, satellite-based Internet service, and/or some other option or combination thereof.

In a typical arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a wireless packet-data interface to, e.g., laptop computers, digital video recorders (DVRs), appliances, and/or any other computing devices or their respective wireless network adapters.

To address gaps in macro-network coverage (e.g. in buildings) and for other reasons, macro-network service providers offer consumers devices referred to herein as femtocells, which may also be referred to as femto base stations, femto BTSs, picocells, pico base stations, pico BTSs, microcells, micro base stations, micro BTSs, and by other names, such as Internet base stations or perhaps low-cost Internet base stations (LCIBs). Note that the aforementioned terms that end in "cell" may also be used generally and herein to refer to the coverage area provided by the respective device. And with respect to the term LCIB, low-cost is not used as a limiting term; that is, devices of any monetary cost may be categorized as LCIBs, though most LCIBs typically will be less expensive on average than most macro-network base stations.

A femtocell may be approximately the size of a desktop phone or WiFi access point, and is essentially a low-power, low-capacity version of a macro base station. Thus, a femtocell may use a power outlet, perhaps with a transformer providing a DC power supply. The femtocell may have a wired (e.g. Ethernet) or wireless (e.g. WiFi) connection with the user's router, and would thus have connectivity to the Internet and/or one or more other packet-data networks via that broadband connection. A femtocell may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

A typical femtocell also has a wireless-communication interface (operating according to, CDMA, EV-DO, and/or one or more other protocols) that is compatible with the user's mobile station(s), such that the femtocell may act as a micro base station, providing coverage for the mobile station(s) on the macro-network provider's network via the user's Internet connection. Usually, a femtocell provides service on a single RF carrier (or on a single carrier per protocol, if multiple protocols (e.g. CDMA and EV-DO) are supported), and transmits what is known as and referred to herein as a pilot beacon, which is a radio beacon that includes overhead messages and parameters that mobile stations use to connect with (i.e. handoff to) the femtocell.

A femtocell typically emits the pilot beacon on one or more macro carriers on which service is provided by the surrounding macro network. If service is provided by the surrounding macro network on only one macro carrier, the femtocell will emit its pilot beacon on that macro carrier. If, as is often the case, service is provided by the surrounding macro network on multiple macro carriers, the femtocell may sequentially step through emitting its pilot beacon on some number of those carriers; that is, the femtocell's pilot beacon may "hop"

on a fixed number of macro carriers, and in that scenario is referred to as a frequency-hopping pilot beacon.

And femtocells typically include a Global Positioning System (GPS) receiver for use in receiving and decoding GPS signals, for use in determination of location, as well as for use in synchronizing operations with other femtocells and/or the macro network, based on timing information embedded in GPS signals. Typically, femtocells have fairly comprehensive auto-configuration capabilities, such that they are largely "plug-and-play" to the user.

Overview

Some mobile stations include a capability known as Simultaneous Hybrid Dual Receive (SHDR). Mobile stations having the SHDR capability (i.e. SHDR mobile stations) are equipped with two of what are known as chains: (1) a transmit and primary receive chain (referred to herein as "TxRx0") and (2) a secondary receive chain (referred to herein as "Rx1"), each of which is a combination of hardware (typically including a dedicated antenna), software, and/or firmware that carries out specific functionality for the mobile station, as described below.

As their names suggest, TxRx0 is used for transmission and primary receipt of data, while Rx1 is used for secondary receipt of data. For example, when on an active (voice or data) call, an SHDR mobile station sends and receives data related to that call via TxRx0. And while on the call, the mobile station monitors a second network for transmissions to the mobile station. That is, it is known for an SHDR mobile station to use TxRx0 to conduct an, e.g., EV-DO call while using Rx1 to check for pages on a, e.g., 1xRTT ("Single Carrier Radio Transmission Technology") CDMA network. Thus, a mobile station may use Rx1 to monitor overhead (e.g. pilot, paging, and sync) channels on a macro network, and process the coding and modulation of incoming signals to deliver information to the mobile station. In current implementations, both TxRx0 and Rx1 are protocol-specific functional components of mobile stations, arranged to transmit and receive data in the case of TxRx0, and to just receive data in the case of Rx1.

Another known use of the SHDR capability in mobile stations is for both TxRx0 and Rx1 to be arranged to operate according to the same air-interface protocol, and to use both chains in combination to enhance the robustness—and thus throughput—of data received from a macro network. As an example, both TxRx0 and Rx1 could be arranged to operate according to EV-DO (i.e. according to IS-856, Release 0 and/or IS-856, Revision A); in that case, for a given voice or data call, both TxRx0 and Rx1 may be used to receive forward-link call data from the macro network, and the mobile station's processing entities may be arranged to accept data from both chains, and to then combine that data into a single output for the user, in order to reduce the amount of error correction needed with respect to forward-link transmissions.

In accordance with the present methods and systems, mobile stations having SHDR capability use their respective TxRx0 chains to engage in communication sessions (i.e. voice and data calls) via a femtocell, while simultaneously using their respective Rx1 chains to monitor a macro network, where the monitoring may include actions such as monitoring the signal strength of one or more macro-network pilot channels, monitoring one or more macro-network paging channels for transmissions to the respective mobile stations from the macro network, and/or one or more other functions. In general, then, the SHDR mobile stations use their respective Rx1 chains to gather macro-network information transmitted by the macro network. Furthermore, a femtocell uses this macro-network information to enhance the quality of service provided by the femtocell as a general matter. In particular, the femtocell uses the macro-network information to make and carry out decisions as to whether or not to instruct one or more of the mobile stations to conduct handoffs to the macro network.

Femtocells typically have a finite and relatively low number of channel elements, which are combinations of hardware, software, and firmware that each enable the femtocell to facilitate (i.e. serve) one active communication session (i.e. voice or data call) for a given mobile station. Thus, with respect to a given femtocell, there is a 1:1 ratio between (i) the number of channel elements that the femtocell has and (ii) the number of active communication sessions that the femtocell can serve at any one time.

In an embodiment, if, at the time a given mobile station tries to initiate a communication session via a given femtocell, all of the femtocell's channel elements are being used for active communication sessions for other mobile stations, the femtocell identifies the mobile station (among those currently receiving service from the femtocell and the one requesting service from the femtocell) that is currently measuring the strongest macro-network signal via its Rx1 chain as the best candidate for handoff to the macro network. The femtocell then instructs the identified mobile station to handoff to the macro network.

This process of instructing the mobile station may include sending the mobile station a message known as a CFSRQM (Candidate Frequency Search Request Message), which includes one or more macro-network carriers on which the mobile station may look for service. In an embodiment, the femtocell may only instruct a mobile station to conduct a handoff to the macro network when that mobile station is receiving a macro-network pilot signal that is above a certain threshold level of signal strength. For purposes of this disclosure, instructing a mobile station to conduct a handoff to the macro network includes instructing the newly-arriving mobile station, which may already by on the macro network, to remain so.

In an embodiment, a femtocell may use signal-strength data and other data gathered about the surrounding macro-network environment by mobile stations using their Rx1 chains to trigger handoff to the macro network. Note that this may be independent of any capacity concerns of the femtocell (e.g. the number of mobile stations getting or wanting service via the femtocell exceeding the number of channel elements that the femtocell has). For example, a mobile station that is engaged in a communication session via the femtocell may determine that the signal strength (e.g. the signal-to-noise ratio, e.g. $E_c/I_o$) of the signal from the femtocell has dipped below a particular signal-strength threshold, and responsively send a pilot strength measurement message (PSMM) to the femtocell to request handoff to the macro network.

While this communication session has been going on, the mobile station has been using its Rx1 chain to gather macro-network data (e.g. pseudorandom number (PN) offsets, pilot-signal strengths, etc.). Note that it is known for non-SHDR mobiles to "tune away" from an active call to check macro-network parameters such as these. This approach is inferior to using the Rx1 approach described herein to monitor the macro network, as no interruption of communication between the femtocell and the mobile station needs to occur, and no messages on the macro network should be missed, due to the continuous nature of the monitoring.

According to the present methods and systems, when a femtocell receives from a mobile station a PSMM that indicates that the strength of the femtocell signal (as received at the mobile station) has fallen below a particular signal-strength threshold, the femtocell evaluates the quality of macro-network signal that the mobile station is currently (or has recently) detected via its Rx1 chain and reported to the femtocell. If that macro-network signal has a strength that is above a certain threshold, the femtocell may instruct the mobile station to handoff to the macro network, perhaps in part by sending the mobile station a CFSRQM.

If, however, that macro-network signal has a strength that is below the certain threshold, the femtocell may not instruct the mobile station to handoff to the macro network, including not sending the mobile station a CFSRQM. And, in that case, the femtocell may inform the user of the mobile station—perhaps via an SMS message to the mobile station, an audio alert played out by the femtocell and/or by the mobile station, a warning message to be displayed on the mobile station, and/or some other alert—that the user's current communication session (e.g. voice or data call) may very well be dropped if the user moves away from the femtocell (due to the lack of sufficient macro coverage).

From time to time, a service provider may have SMS and/or page messages to be sent to an SHDR mobile station that is (a) registered with—and perhaps using T×R×0 to engage in an active voice call or data call via—a femtocell and (b) using R×1 to monitor the macro network. The service provider may initially attempt to transmit these SMS and/or page messages to the SHDR mobile station via the femtocell. If that fails, and perhaps only if that fails a certain number of times, according to the present methods and systems, the service provider may then send the SMS and/or page messages to the mobile station via the macro network, for receipt by the SHDR mobile station via R×1. This approach may be particularly beneficial in times where the mobile station is "ping-ponging" between being registered on the femtocell and being registered on the macro network.

And it should be noted that the above overview is illustrative and not limiting. That is, additional and/or different features may be present in some embodiments. It should be noted as well that any description of a mobile station, a femtocell, and/or a macro network operating according to any particular protocol such as 1×RTT CDMA is by way of example, and that any suitable protocol(s) may be used instead, such as EV-DO, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture a. An Exemplary Communication System

Figure 1:
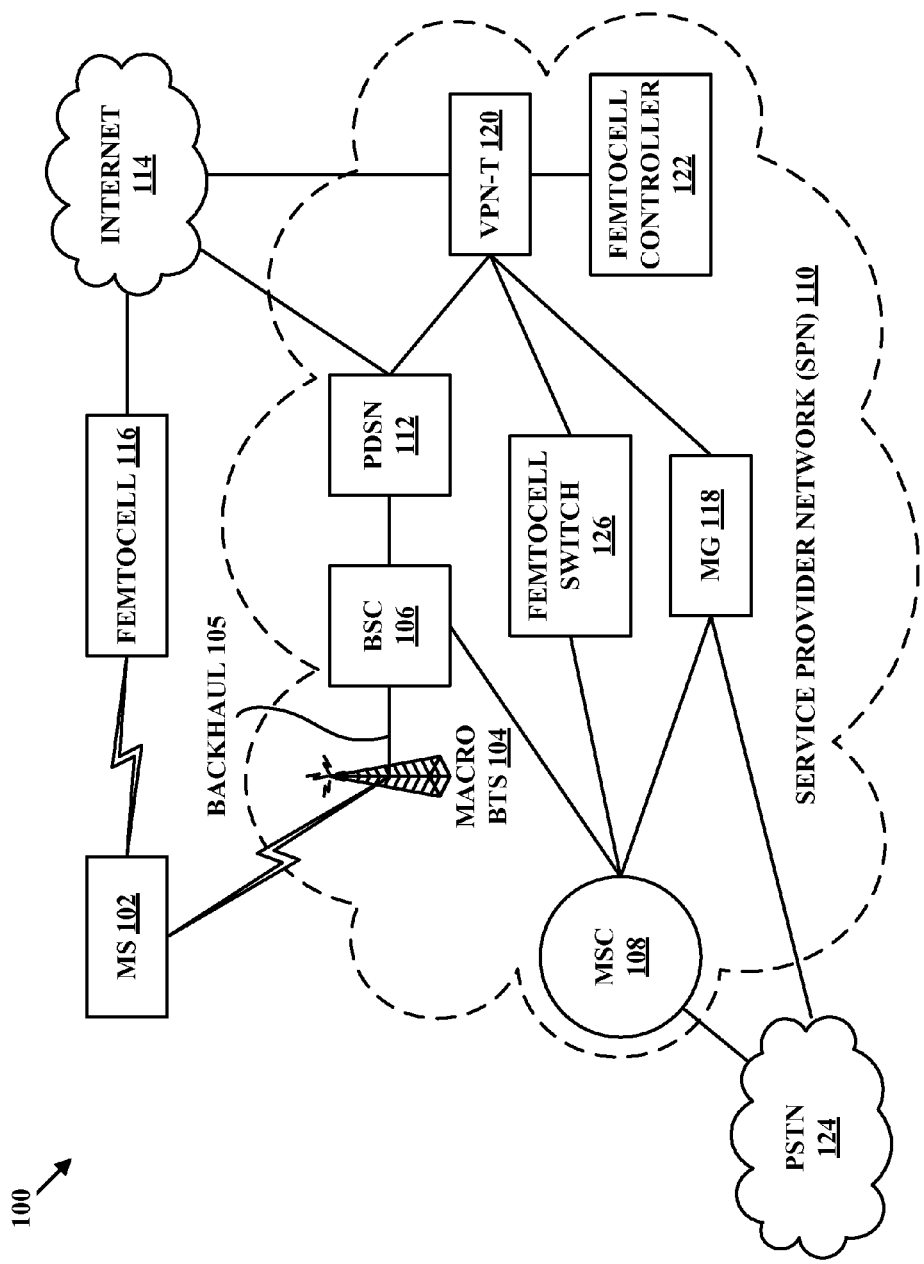
FIG. 1 depicts a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, communication system 100 includes mobile station 102, macro BTS 104, BSC 106, MSC 108, service provider network 110, PDSN 112, Internet 114, femtocell 116, media gateway 118, VPN terminator 120, femtocell controller 122, PSTN 124, and femtocell switch 126. Additional entities could be present, such as additional mobile stations in communication with macro BTS 104, additional entities in communication with Internet 114, PSTN 124, etc. And there could be one or more devices and/or networks making up at least part of one or more communication links. As an example, there could be one or more routers, cable modems, and/or other devices or networks on the link between Internet 114 and femtocell 116.

Mobile station 102 may be any mobile device arranged to carry out the mobile-station functions described herein, and is also described in connection with FIG. 3. Mobile station 102 may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more femtocells over suitable air interfaces. The chipset could be suitable for CDMA communication in compliance with one or more standards such as IS-95 and IS-2000. The chipset or wireless-communication interface in general may also or instead be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any entity arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more (e.g. CDMA) coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any entity arranged to carry out the BSC functions described herein, and may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity.

MSC 108 may be any entity arranged to carry out the MSC functions described herein, and may include a communication interface, a processor, and data storage comprising instructions executable by the processor to carry out those MSC functions. The communication interface may include one or more wired and/or wireless interfaces for communicating with at least BSC 106, MG 118, femtocell switch 126, and PSTN 124. In general, MSC 108 acts as a switch between (a) PSTN 124 and (b)(i) one or more BSCs such as BSC 106 and (ii) one or more femtocell switches such as femtocell switch 126, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any entity arranged to carry out the PDSN functions described herein, and may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b)(i) BSCs such as BSC 106 and (ii) VPN terminators such as VPN terminator 120, facilitating packet-data communication between mobile stations and Internet 114, via macro base stations and femtocells.

Internet 114 may be the well-known global packet-data network generally referred to as the Internet. However, Internet 114 may also be or include one or more other packet-data networks. As such, Internet 114 may include one or more wide area networks, one or more local area networks, one or more public networks, one or more private networks, one or more wired networks, one or more wireless networks, and/or one or more other networks. Devices in communication with Internet 114 may exchange data using a packet-switched protocol such as the Internet Protocol (IP), and may be identified by an address such as an IP address.

Femtocell 116 may be any computing and communication device arranged to carry out the femtocell functions described herein, and may include a communication interface, a processor, and data storage comprising instructions executable by the processor for carrying out those femtocell functions. The communication interface may include (a) a wireless interface for communicating with one or more mobile stations according to a protocol such as CDMA (and/or one or more other protocols) and (b) an Ethernet or WiFi interface for communicating with a device such as a router and/or a cable modem. Femtocell 116 may also have a GPS receiver and/or other location module, and is also described in connection with FIG. 2.

Media gateway 118 may be any entity arranged to carry out the media-gateway functions described herein, and may include a communication interface, a processor, and data storage comprising instructions executable by the processor for carrying out those media-gateway functions. The communication interface may include a circuit-switched interface and a packet-switched interface. Media gateway 118 may (a) receive packet-based communications from SPN 110, convert those to circuit-switched communications, and pass them to MSC 108 and/or PSTN 124 and (b) receive circuit-switched communications from MSC 108 and/or PSTN 124, convert those to packet-based communications, and pass them to SPN 110.

VPN terminator 120 may be any entity arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least PDSN 112, Internet 114, media gateway 118, femtocell controller 122, and femtocell switch 126. In general, VPN terminator 120 establishes secure VPN connections over Internet 114 with femtocells such as femtocell 116, enabling the femtocells to securely communicate with devices on SPN 110 and perhaps beyond.

Femtocell controller 122 may be any entity arranged to carry out the femtocell-controller functions described herein, and may include a communication interface, a processor, and data storage comprising instructions executable by the processor for carrying out those femtocell-controller functions. The communication interface may include one or more wired and/or wireless interfaces for communicating with at least VPN terminator 120, along with perhaps one or more other entities on SPN 110, and beyond. Among other functions, femtocell controller 122 communicates via VPN terminator 120 with femtocells such as femtocell 116, and may receive requests from femtocells for configuration data, and those requests may include, among other values, indications of the femtocells' locations. Femtocell controller 122 may also operate to select various operational parameters for femtocells (e.g. carrier, PN offset, whether to broadcast a pilot beacon, contents of the pilot beacon, transmission-power level, etc.), and to transmit those parameters to femtocells, perhaps along with other configuration data and messaging.

Femtocell switch 126 may be any entity arranged to carry out the femtocell-switch functions described herein, and may include a communication interface, a processor, and data storage comprising instructions executable by the processor for carrying out those femtocell-switch functions. The communication interface may include one or more wired and/or wireless interfaces for communicating with at least MSC 108 and VPN terminator 120. In general, femtocell switch 126 acts as a switch between MSC 108 and VPN terminator 120, enabling mobile stations to communicate via femtocells over PSTN 124 via MSC 108.

b. An Exemplary Femtocell

Figure 2:
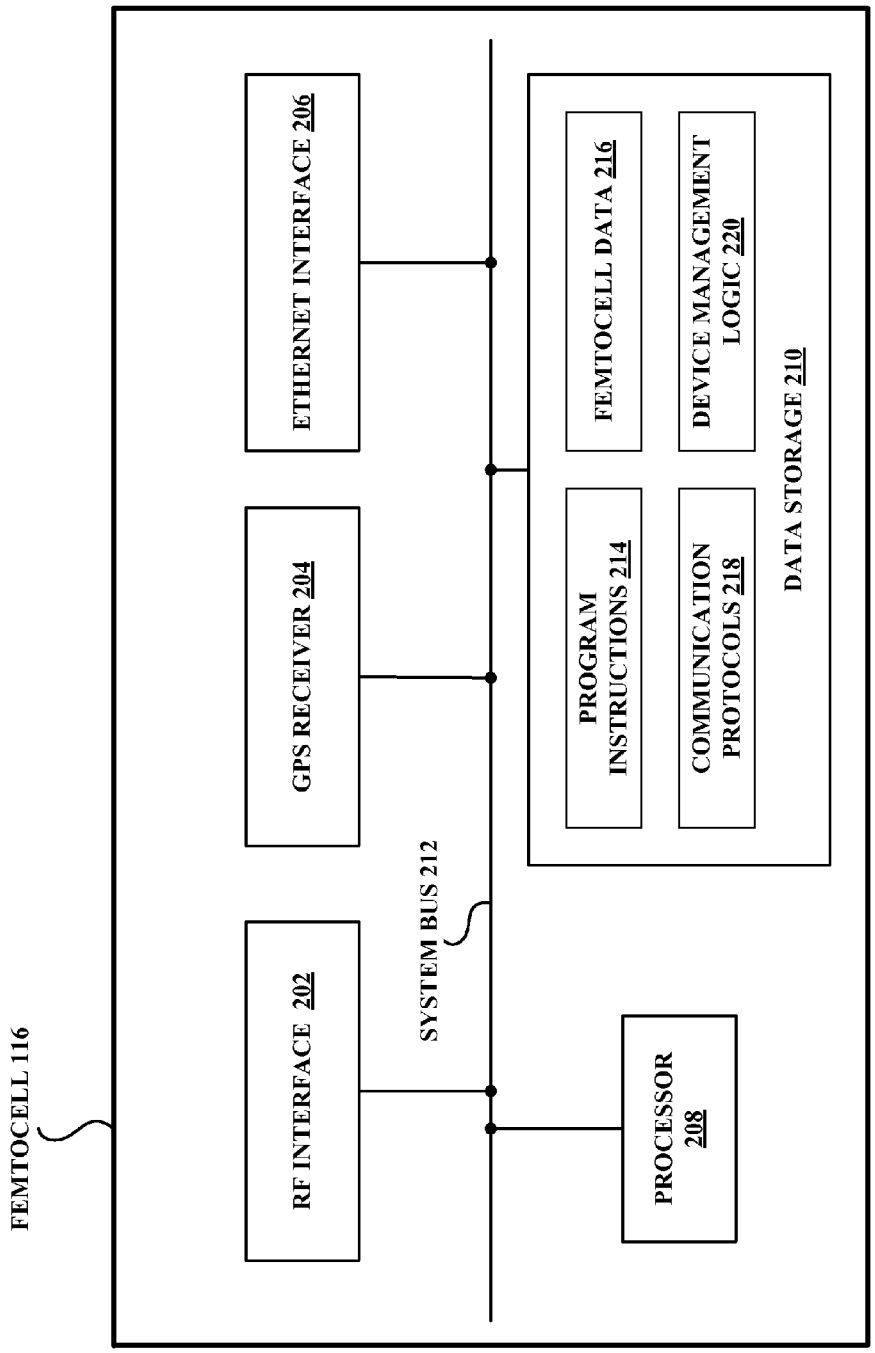
FIG. 2 depicts a femtocell, in accordance with exemplary embodiments.

FIG. 2 depicts an exemplary diagram of femtocell 116, which includes an RF interface 202, a GPS receiver 204, an Ethernet interface 206, a processor 208, and data storage 210, all communicatively linked by a system bus or other suitable mechanism 212. Note that femtocell 116 could have additional and/or different components; this structure is by way of example.

RF (i.e. wireless-communication) interface 202 may include one or more antennas, one or more chipsets, a set of one or more channel elements, and/or one or more other components suitable for providing a wireless coverage area according to a wireless-communication protocol such as CDMA (and/or one or more other protocols). GPS receiver 204 may be any known or hereafter-developed GPS receiver, suitable for receiving and decoding GPS signals for location and timing purposes, perhaps among other purposes. In some embodiments, a femtocell may have a location module in addition to or instead of a GPS receiver.

Ethernet interface 206 may provide a wired packet-data interface for communicating with a device such as a router or cable modem. Processor 208 may comprise multiple (e.g. parallel) processors, such as a general purpose microprocessor and/or a discrete digital signal processor. The data storage 210 may take various forms, in one or more parts, such as a non-volatile storage block and/or a removable medium, and may contain (a) program instructions 214 executable by processor 208 for carrying out the femtocell functions described herein, (b) femtocell data 216, which may be any operational or other data stored for use by femtocell 116, (c) communication protocols 218, facilitating and enabling communication with one or more other devices, and (d) device management logic 220, perhaps for memory and file management.

c. An Exemplary Mobile Station

Figure 3:
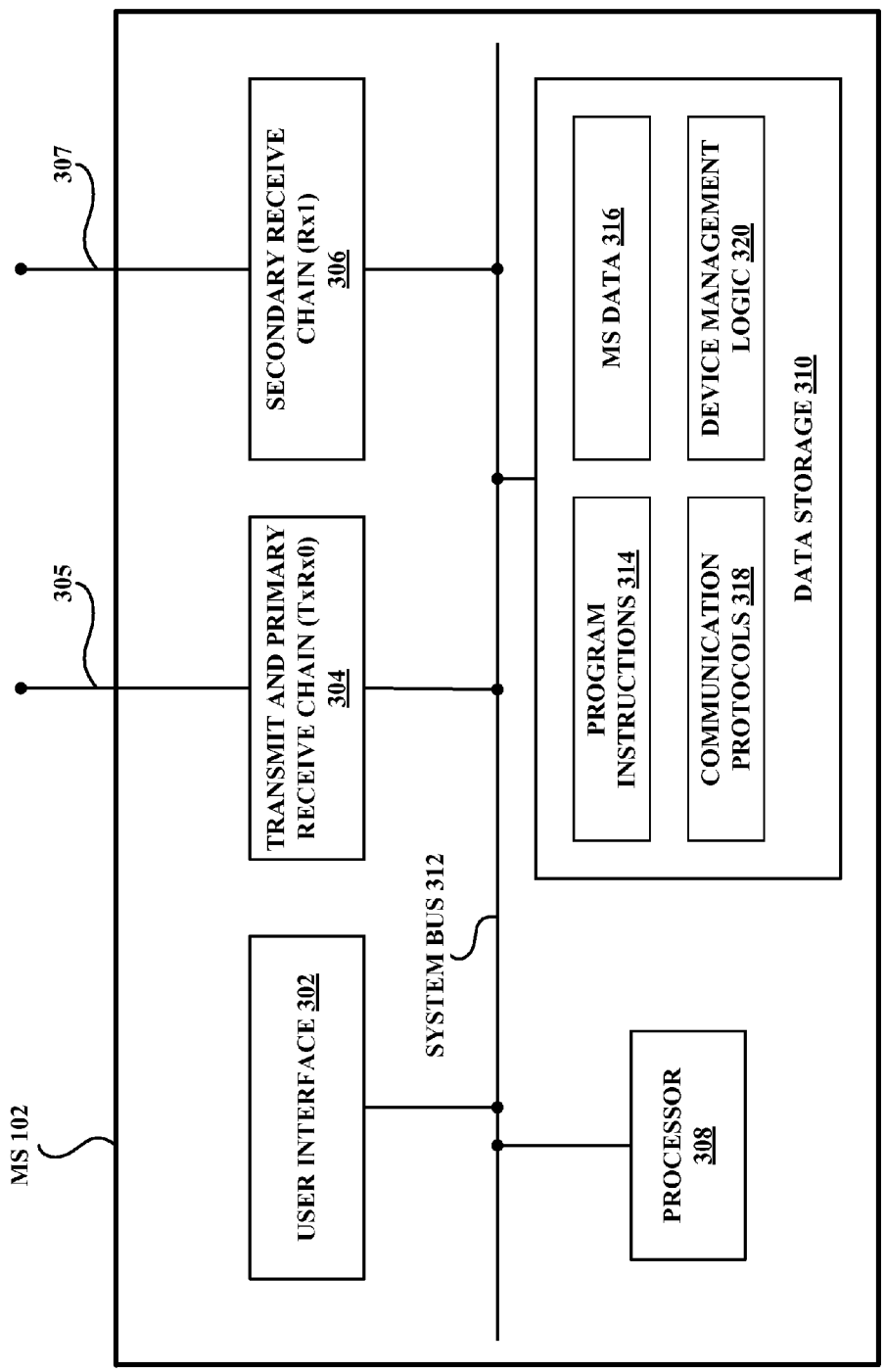
FIG. 3 depicts a mobile station, in accordance with exemplary embodiments.

FIG. 3 depicts an exemplary diagram of mobile station 102, which includes a user interface 302, a transmit and primary receive chain (TxRx0) 304 having an associated antenna 305, a secondary receive chain (Rx1) 306 having an associated antenna 307, a processor 308, and data storage 310, all communicatively linked by a system bus or other suitable mechanism 312. Note that mobile station 102 could have additional and/or different components, and that this structure is provided by way of example.

User interface 302 may include buttons, a touchscreen, a microphone, and/or any other elements for receiving inputs, as well as a speaker, one or more displays, and/or any other elements for communicating outputs. TxRx0 304 may include any combination of hardware (e.g. a dedicated antenna 305), software, and/or firmware for transmitting data to and receiving data from femtocells and/or macro BTSs, perhaps among other entities. Rx1 306 may include any combination of hardware (e.g. a dedicated antenna 307), software, and/or firmware for receiving data from femtocells and/or macro BTSs, perhaps among other entities.

Processor 308 may comprise multiple (e.g. parallel) processors, such as a general purpose microprocessor and/or a discrete digital signal processor. The data storage 310 may take various forms, in one or more parts, such as a non-volatile storage block and/or a removable medium, and may contain (a) program instructions 314 executable by processor 308 for carrying out the mobile-station functions described herein, (b) mobile-station data 316, which may be any operational or other data stored for use by mobile station 102, (c) communication protocols 318, facilitating and enabling communication with one or more other devices, and (d) device management logic 320, perhaps for memory and file management.

2. Exemplary Operation

Figure 4:
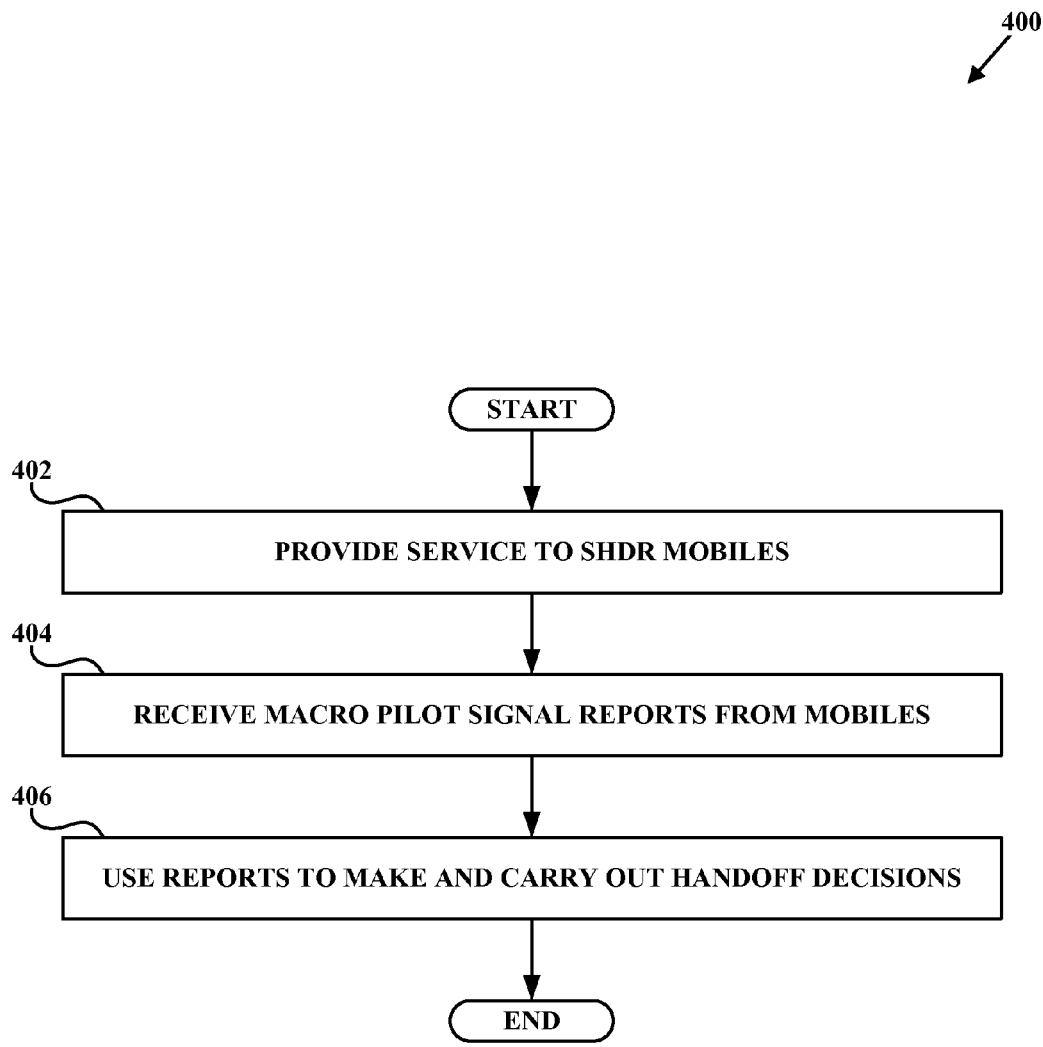
FIG. 4 depicts a method, in accordance with exemplary embodiments.

FIG. 4 depicts a method 400, which may be carried out by a femtocell such as femtocell 116, or may be carried out by femtocell 116 in cooperation with one or more other entities.

As shown in FIG. 4, method 400 begins at step 402, when femtocell 116 provides service to one or more SHDR mobile stations, each comprising a TxRx0 and an Rx1. Each SHDR mobile station uses its respective TxRx0 for communicating with and via femtocell 116, and uses its respective Rx1 for monitoring a macro network, including monitoring at least a detected signal strength of one or more respective macro-network pilot channels of one or more macro-network coverage areas (such as cells and/or sectors).

In an embodiment, at least one SHDR mobile station's TxRx0 and Rx1 each include a respective dedicated antenna. In an embodiment, monitoring the macro network comprises monitoring at least one overhead channel (e.g. a pilot channel, a paging channel, and/or a sync channel) of the macro network. In the case of monitoring one or more paging channels, an SHDR mobile station may be checking for messages (e.g. SMS and/or page messages) addressed to the mobile station.

At step 404, femtocell 116 receives reports from at least the SHDR mobile stations to which femtocell 116 is providing service, the reports reflecting at least the detected signal strengths of the respective macro-network pilot channels.

At step 406, femtocell 116 uses the received reports for making and carrying out decisions as to whether or not to instruct one or more SHDR mobile stations to handoff to the macro network. In an embodiment, femtocell 116 comprises a given number of channel elements; furthermore, femtocell 116 may receive an initiation request from an SHDR mobile station to use one of the femtocell's channel elements to engage in a communication session at a time when all of the femtocell's channel elements are being used for active communication sessions for other SHDR mobile stations.

In response to receiving the initiation request, femtocell 116 may use the received reports to identify which mobile station, among the mobile station that sent the initiation request and the mobile stations currently using the femtocell's channel elements, is currently receiving the strongest signal from the macro network. Step 406 may then involve instructing the identified mobile station to handoff to the macro network, perhaps involving sending the identified mobile station a message, such as a CFSRQM, identifying one or more macro carriers as handoff candidates for the identified mobile station. In an embodiment, instructing the identified mobile station to handoff to the macro network may be conditioned upon the identified mobile station reporting a macro-network signal that is above a certain threshold level of signal strength.

In an embodiment, femtocell 116 may receive a handoff request (e.g. a pilot strength measurement message (PSMM)) from a given mobile station, the handoff request indicating that a signal strength of a signal from the femtocell, as received at the given mobile station, is below a first threshold level of signal strength. In that case, step 406 may involve using reports from the given mobile station to evaluate a quality of macro-network signal currently being received by the given mobile station. In particular, femtocell 116 may instruct the given mobile station to handoff to the macro network when the quality of macro-network signal currently being received by the given mobile station is above a second threshold level of signal strength.

Conversely, then, femtocell 116 may not instruct the given mobile station to handoff to the macro network when the quality of macro-network signal currently being received by the given mobile station is below the second threshold level of signal strength. In this latter case, femtocell 116 may (e.g. visibly and/or audibly) alert a user of the given mobile station that moving away from the femtocell is likely to cause a dropped call.

Finally, in an embodiment, the macro network may transmit at least one message to a given SHDR mobile station, for receipt by the given mobile station using its respective Rx1, after at least one attempt to transmit the at least one message to the mobile station via femtocell 116 failed. The at least one message may include an SMS message and/or a page message.

3. Conclusion

Various exemplary embodiments have been described above. Those skilled in the art will understand, however, that changes and modifications may be made to those examples without departing from the scope of the claims.

The invention claimed is:

1. A method comprising:
   providing service, by a femtocell, to one or more Simultaneous Hybrid Dual Receive (SHDR) mobile stations, wherein the SHDR mobile stations each comprise a transmit and primary receive chain (TxRx0) and a secondary receive chain (Rx1), wherein each SHDR mobile station uses its respective TxRx0 for communicating with and via the femtocell, and wherein each SHDR mobile station uses its respective Rx1 for monitoring a macro network, wherein monitoring the macro network comprises monitoring at least a detected signal strength of one or more respective macro-network pilot channels of one or more macro-network coverage areas;
   receiving reports, by the femtocell, from at least the SHDR mobile stations to which the femtocell is providing service, the reports reflecting at least the detected signal strengths of the respective macro-network pilot channels;
   receiving a handoff request, by the femtocell, from a given mobile station, the handoff request indicating that a signal strength of a signal from the femtocell, as received at the given mobile station, is below a first threshold level of signal strength;
   using the received reports, by the femtocell, for making and carrying out decisions as to whether or not to instruct one or more SHDR mobile stations to handoff to the macro network, wherein making and carrying out decisions as to whether or not to instruct one or more SHDR mobile stations to handoff to the macro network comprises (i) using reports from the given mobile station to evaluate a quality of macro-network signal currently being received by the given mobile station, (ii) not instructing the given mobile station to handoff to the macro network when the quality of macro-network signal currently being received by the given mobile station is below a second threshold level of signal strength, and
   alerting a user of the given mobile station that moving away from the femtocell risks causing a dropped call when the quality of macro-network signal currently being received by the given mobile station is below the second threshold level of signal strength, wherein alerting the user comprises providing an alert selected from the group consisting of an audible alert and a visible alert.

2. The method of claim 1, wherein at least one SHDR mobile station's TxRx0 and Rx1 each include a respective dedicated antenna.

3. The method of claim 1, wherein monitoring the macro network further comprises monitoring at least one overhead channel of the macro network.

4. The method of claim 3, wherein the at least one overhead channel comprises at least one of a pilot channel, a paging channel, and a sync channel.

5. The method of claim 3, wherein the at least one overhead channel comprises at least one paging channel, and wherein monitoring the macro network further comprises monitoring the at least one paging channel for messages addressed to the mobile station.

6. The method of claim 5, wherein the messages comprise at least one of an SMS message and a page message.

7. The method of claim 1, wherein the femtocell comprises a given number of channel elements, the method further comprising:
   receiving, by the femtocell, an initiation request from an SHDR mobile station to use one of the femtocell's channel elements to engage in a communication session at a time when all of the femtocell's channel elements are being used for active communication sessions for other SHDR mobile stations; and
   responsive to receiving the initiation request, using, by the femtocell, the received reports to identify which mobile station, among the group consisting of the mobile station that sent the initiation request and the mobile stations currently using the femtocell's channel elements, is currently receiving the strongest signal from the macro network,
   wherein making and carrying out decisions as to whether or not to instruct one or more SHDR mobile stations to handoff to the macro network comprises instructing the identified mobile station to handoff to the macro network.

8. The method of claim 7, wherein instructing the identified mobile station to handoff to the macro network comprises sending the identified mobile station a message identifying one or more macro-network carriers as handoff candidates for the identified mobile station.

9. The method of claim 8, wherein the message is a Candidate Frequency Search Request Message (CFSRQM).

10. The method of claim 7, wherein instructing the identified mobile station to handoff to the macro network is conditioned upon the identified mobile station reporting a macro-network signal that is above a certain threshold level of signal strength.

11. The method of claim 1, wherein the request comprises a pilot strength measurement message (PSMM).

12. The method of claim 1, wherein making and carrying out decisions as to whether or not to instruct one or more SHDR mobile stations to handoff to the macro network further comprises instructing the given mobile station to handoff to the macro network when the quality of macro-network signal currently being received by the given mobile station is above a second threshold level of signal strength.

13. The method of claim 12, wherein instructing the given mobile station to handoff to the macro network comprises sending the given mobile station a message identifying one or more macro-network carriers as handoff candidates for the given mobile station.

14. The method of claim 13, wherein the message is a Candidate Frequency Search Request Message (CFSRQM).

15. The method of claim 1, further comprising the macro network transmitting at least one message to a particular SHDR mobile station, for receipt by the particular mobile station using its respective Rx1, after at least one attempt to transmit the at least one message to the particular mobile station via the femtocell failed, wherein the at least one message comprises at least one of an SMS message and a page message.

16. A femtocell comprising:
a wireless-communication interface;
a processor; and
non-transitory data storage storing instructions executable by the processor for:
   providing service to one or more Simultaneous Hybrid Dual Receive (SHDR) mobile stations, wherein the SHDR mobile stations each comprise a transmit and primary receive chain (TxRx0) and a secondary receive chain (Rx1), wherein each SHDR mobile station uses its respective TxRx0 for communicating with and via the femtocell, and wherein each SHDR mobile station uses its respective Rx1 for monitoring a macro network, wherein monitoring the macro network comprises monitoring at least a detected signal strength and an identifier of one or more respective macro-network pilot channels of one or more macro-network coverage areas,
   receiving reports from at least the SHDR mobile stations to which the femtocell is providing service, the reports reflecting at least the detected signal strengths of the respective macro-network pilot channels, and
   using the received reports for making and carrying out decisions as to whether or not to instruct one or more SHDR mobile stations to handoff to the macro network, including (i) determining based at least in part on one of the received reports that a given one of the SHDR mobile stations to which the femtocell is providing service is receiving macro-network signal strength that is below a threshold level of signal strength, and (ii) responsive to the determining, providing for presentation to a user of the given mobile station an alert that the given mobile station moving away from the femtocell risks causing a dropped call, wherein the presentation of the alert comprises presentation selected from the group consisting of audible presentation and visible presentation.

17. A femtocell comprising:
a wireless-communication interface;
a processor; and
data storage comprising instructions executable by the processor for, while the femtocell is serving a given mobile station:
   (i) receiving from the given mobile station one or more reports of macro network signal strength detected by the given mobile station from a macro network,
   (ii) receiving from the given mobile station a handoff request indicating that signal strength detected by the given mobile station from the femtocell is below a first threshold level of signal strength,
   (iii) determining based at least in part on the one or more received reports that the macro network signal strength being received by the given mobile station is below a second threshold level of signal strength, and
   (iv) responsive to the determining, not instructing the given mobile station to hand off to the macro network in response to the handoff request, and providing for presentation to a user of the given mobile station a notification that the given mobile station moving away from the femtocell risks causing a dropped call, wherein the presentation of the notification comprises presentation selected from the group consisting of audible presentation and visible presentation.

* * * * *